United States Patent [19]
Kurtzberg et al.

[11] Patent Number: 6,009,379
[45] Date of Patent: Dec. 28, 1999

[54] METHOD FOR CONTROLLING MANUFACTURING PROCESSES VIA EFFICIENT EXPERIMENTAL

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 08/873,206

[22] Filed: Jun. 11, 1997

[51] Int. Cl.⁶ .................................................. G06F 101/06
[52] U.S. Cl. ........................................ 702/84; 364/148.01
[58] Field of Search .................... 364/468.09, 148.01; 702/84

[56] References Cited

U.S. PATENT DOCUMENTS 5,621,665  4/1997  Ghosh et al. .............................. 702/84

*Primary Examiner*—William Grant
*Assistant Examiner*—Chad Rapp
*Attorney, Agent, or Firm*—McGinn & Gibb, P.C.; Stephen C. Kaufman, Esq.

[57] ABSTRACT

This invention discloses a methodology for controlling a manufacturing process using an effective optimal experimental design for enabling a manufacturing engineer to determine process status and proper setpoints for all process parameters. The method is optimal, in a sense of requiring a smallest set of measurements which can capture all main effects and all their interactions.

11 Claims, 3 Drawing Sheets

```
XDESIGN  POLYTOPE A1    F 120    Trunc=120 Size=49 Line=27 Col=1 Alt=0
====>   |
00017   ∇DESIGN POLYTOPE;                  ⍝ POLYTOPE DESIGN
00018    ;N2←⌊K÷2                          ⍝ NO. OF PAIRS (=K÷2 FOR K EVEN)
00019    AX←(K,K+1)⍴0                      ⍝ INITIALIZE VERTICES MATRIX
00020    ODD←¯1+2×⍳N2                      ⍝ ODD COORD. FOR COSINES
00021    EVEN←2×⍳N2                        ⍝ EVEN COORD. FOR SINES
00022    BUF←((○2)÷(K+1))×(⍳N2)∘.×(0,⍳K)   ⍝ ARGUMENTS FOR COSINES AND SINES
00023    AX[ODD;]←2○BUF                    ⍝ ODD VERTICES COORD.
00024    AX[EVEN;]←1○BUF                   ⍝ EVEN VERTICES COORD.
00025    ⌽(0≠2|K)/'AX[K;]←(¯1*⍳0,⍳K)÷2*0.5'⍝ LAST COORD. FOR K ODD
00026    C←((K-1)=+/C)⌿C←⍉((K+1)⍴2)⊤(⍳2*K+1)-⎕IO ⍝ COMBS. K-1 OUT OF K+1
00027    OBJECTS                           ⍝ INITIALIZE INTERACTIONS MATRIX
00028    BUF←(K,1)⍴0
00029 LL:
00030    BUF←BUF,(+/C[1;]/AX)÷2             ⍝ USE 1ST ROW OF C FOR INTERACTION
00031    C←(1 0)↓C                          ⍝ DONE, SO ELIMINATE USED 1ST ROW
00032    →(0<1↑⍴C)/LL                       ⍝ LOOP IF NOT FINISHED
00033    BUF←(0 1)↓BUF                      ⍝ DELETE INITIAL 0'S
00034  ⍝ FOLLOWING LINE ADDED FOR 2 VARS DESIGN
00035    ⌽(K=2)/'BUF[1;]←¯BUF[1;]'
00036  ⍝ THE FOLLOWING LINE PROJECTS THE INT. POINTS ONTO THE VERTICES SPHERE
00037    BUF←BUF×⍉(⍴BUF)⍴((+⌿AX[;1]*2)÷+⌿BUF*2)*0.5 ⍝ PROJECT-ON VERTICES
1-HLP 2-SAVE 3-END 4-RGT/LFT 5-TOPBOT 6-S/JOIN 7-UP 8-DN 9-= 10-U7 11-D7 12-EOL
```

Fig. 2

POLYTOPE EXPERIMENTAL DESIGN FOR O/L RESPONSE IN FILE H-LEVEL DATA A

FOR 6 INPUT VARIABLES, THIS DESIGN CALLS FOR 28 MEASUREMENT SETS

|    | X      | Y      | ROT    | SKEW   | MAG    | AMAG   |
|----|--------|--------|--------|--------|--------|--------|
| 1  | 4.299  | .000   | 2.866  | .000   | 1.433  | .000   |
| 2  | 2.680  | 3.361  | -.638  | 2.794  | -1.291 | .622   |
| 3  | -.957  | 4.191  | -2.582 | -1.243 | .893   | -1.120 |
| 4  | -3.873 | 1.865  | 1.787  | -2.241 | -.319  | 1.397  |
| 5  | -3.873 | -1.865 | 1.787  | 2.241  | -.319  | -1.397 |
| 6  | -.957  | -4.191 | -2.582 | 1.243  | .893   | 1.120  |
| 7  | 2.680  | -3.361 | -.638  | -2.794 | -1.291 | -.622  |
| 8  | -5.406 | -2.603 | -1.726 | -2.164 | -.110  | -.482  |
| 9  | -2.589 | -3.246 | -.220  | .963   | -1.802 | .868   |
| 10 | -.330  | -1.445 | -3.604 | 1.736  | -.863  | -1.082 |
| 11 | -.330  | 1.445  | -3.604 | -1.736 | -.863  | 1.082  |
| 12 | -2.589 | 3.246  | -.220  | -.963  | -1.802 | -.868  |
| 13 | -5.406 | 2.603  | -1.726 | 2.164  | -.110  | .482   |
| 14 | -1.335 | -5.850 | 2.494  | -1.201 | .308   | .386   |
| 15 | .924   | -4.048 | -.890  | -.429  | 1.247  | -1.564 |
| 16 | .924   | -1.159 | -.890  | -3.900 | 1.247  | .601   |
| 17 | -1.335 | .643   | 2.494  | -3.127 | .308   | -1.349 |
| 18 | -4.152 | .000   | .988   | .000   | 2.000  | .000   |
| 19 | 3.741  | -4.691 | .616   | 2.699  | -.445  | -.214  |
| 20 | 3.741  | -1.802 | .616   | -.772  | -.445  | 1.950  |
| 21 | 1.482  | .000   | 4.000  | .000   | -1.384 | .000   |
| 22 | -1.335 | -.643  | 2.494  | 3.127  | .308   | 1.349  |
| 23 | 6.000  | .000   | -2.768 | .000   | .494   | .000   |
| 24 | 3.741  | 1.802  | .616   | .772   | -.445  | -1.950 |
| 25 | .924   | 1.159  | -.890  | 3.900  | 1.247  | -.601  |
| 26 | 3.741  | 4.691  | .616   | -2.699 | -.445  | .214   |
| 27 | .924   | 4.048  | -.890  | .429   | 1.247  | 1.564  |
| 28 | -1.335 | 5.850  | 2.494  | 1.201  | .308   | -.386  |

Fig. 3

METHOD FOR CONTROLLING MANUFACTURING PROCESSES VIA EFFICIENT EXPERIMENTAL

FIELD OF THE INVENTION

This invention relates to a method for controlling manufacturing processes via efficient experimental design.

INTRODUCTION TO THE INVENTION

An important inquiry related to manufacturing processes is to ascertain whether or not a process is in control or is out-of-control, to an end of effecting expedients for bringing an out-of-control process back into control.

A typical such inquiry for ascertaining whether or not a manufacturing process is in control, may subsume employing conventional SPC charts (Statistical Process Control). Here, if a manufacturing process is not in control, the parameters of the process may be adjusted, using experimental design, to thereby determine correct parameter settings for primary or main process effects.

Other representative techniques for ascertaining the manufacturing process status, for example, a Taguchi design, comprise small experimental designs, in contrast to the primary or main effect manufacturing process interactions subsumed by the SPC technique.

SUMMARY OF THE INVENTION

Our work centers on a critique of the capabilities and viability of the foregoing representative control techniques, to an end of disclosing novel methodology for addressing this situation.

Our motivation, in this regard, is implied when we note that, on the one had, while the SPC type techniques can advantageously take into account all process parameters and all their interactions, they are disadvantageously costly in time and they disrupt the manufacturing process; on the other hand, we note that the small experimental designs, such as the Taguchi design, are deficient in the sense that some basic parameter interactions may not be taken into account, thereby disadvantageously yielding non-optimal or possibly improper recommendations.

This critique of the representative extant control techniques suggests to us a need for an experimental design which can capture all the main processing effects and their interactions, consistent with a least cost in terms of a required number of disruptive experiments. We respond to this need by way of novel methodology for controlling manufacturing processes via efficient experimental design.

In a first aspect, the novel method comprises the steps of:

(1) representing in a k dimensional space, k specific values for k variables representative of manufacturing parameter values;

(2) developing a (k−1) dimensional space corresponding to the surface of the k dimensional space;

(3) selecting a set of n points on the surface of the k dimensional space such that a coverage density of the n points on the (k−1) dimensional surface is uniform, whereby the (k−1) dimensional surface is covered so that no manufacturing parameter value is weighted more than any other manufacturing parameter value.

In a second aspect, the novel method comprises the steps of:

(1) generating in k dimensional space, a k dimensional simplex circumscribed by a (k−1) dimensional spherical shell;

(2) selecting (k+1) vertices of the simplex comprising k vertices corresponding to k manufacturing variables plus a constant for a manufacturing model;

(3) selecting all $0.5k(k+1)$ pairs of the vertices of said k dimensional simplex;

(4) locating the midpoint of each said pairs of the vertices of said k dimensional simplex; and (5) projecting all located midpoints onto the (k−1) dimensional spherical shell, identifying all pairwise interactions between manufacturing process parameters;

thereby identifying all main effects and all pairwise interactions between manufacturing process parameters, resulting in an efficient experimental design.

The novel method, as defined, can realize important advantages. For example, it can enable full coverage of all process parameters and all their pairwise interactions. At the same time, it requires a minimum number of experimental measurements to achieve this full coverage, thereby minimizing interference with normal manufacturing production.

BRIEF DESCRIPTION OF THE DRAWINGS

The invention is illustrated in the accompanying drawing, in which:

FIG. 2 shows a program for realization of an Example of the instant method; and

FIG. 3 shows data generated in accordance with the Example of the instant method.

DETAILED DESCRIPTION OF THE INVENTION

Figure 1:
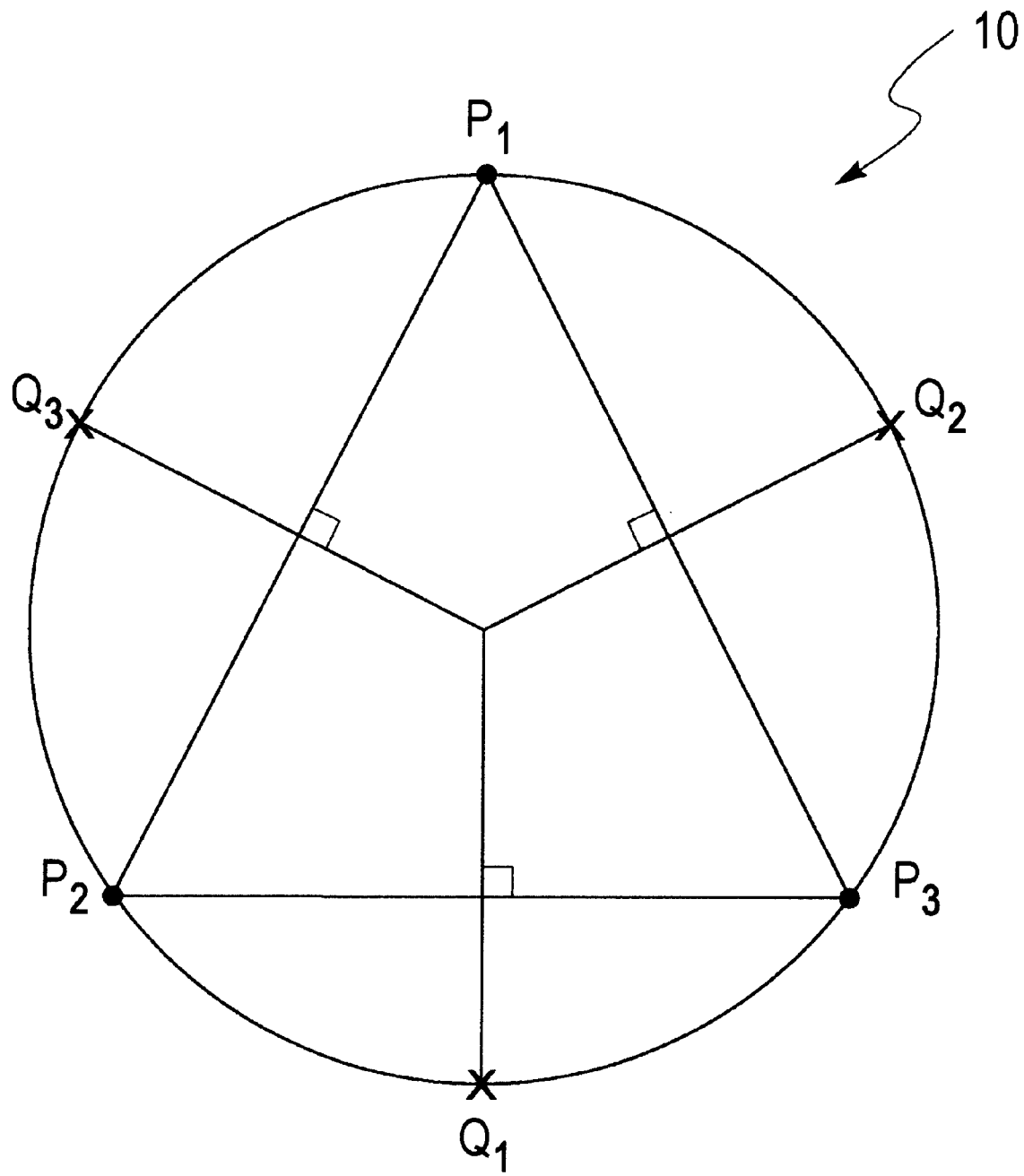
FIG. 1 shows a two-dimensional spherical shell developed in accordance with one embodiment of the instant method.

The detailed description of the invention proceeds by first re-conceptualizing the summarized invention by way of a preferred three-step methodology, and then by presenting an Example of the invention. Preliminarily, we note the following:

Given a process with k independent variables, the smallest set of measurements which accounts for all main effects and all pairwise interactions is: $n=0.5(k+1)(k+2)$. These include all linear and quadratic terms in the expansion of any process behavior function to 2nd order. In a k dimensional space, each point represents specific k values for the k independent variables.

The problem is to select a set of n points in such a way that the coverage density of the n points on the k dimensional surface is uniform. Geometrically, it may be visualized in terms of a k dimensional spherical shell on which n points are to be selected in such a way that there is no bias for any portion of the shell. In other words, the shell is uniformly covered so that no process variable is weighted more than any of the other variables.

An example of a k=2 dimensional spherical shell is shown in FIG. 1, numeral 10, wherein n=6 comprising three primary values $(P_1, P_2, P_3)$ and three values of the primary parameters for the interactions that lie on the arcs $(Q_1, Q_2, Q_3)$ connecting the primary parameters.

Step 1

Step 1 comprises generating a k dimensional simplex with a circumscribed spherical shell of radius 1, and selecting the coordinates of its vertices as the first k+1 points of the design. These represent the k primary effects of the design plus a constant term. (The constant term controls the mean of the process).

Mathematically, these k+1 points are given by the coordinates $(x_1 \ldots x_k)$ where $$x_{2f-1} = \cos\frac{2jm\pi}{k+1} \text{ and } x_{2f} = \sin\frac{2jm\pi}{k+1}$$

and where j=1, 2 . . . [k/2] and, for k odd, $$x_k = \frac{(-1)^x}{\sqrt{2}}.$$

Here m=0, 1, 2 . . . , k denote the k+1 points which are the vertices of the k dimensional regular simplex of length $\sqrt{K+1}$.

For further instruction on this step, reference may be made to S. A. Robertson, "Polytopes and Symmetry", Cambridge, 1988; B. Greenbaum, "Convex Polytopes", Dover, 1973, which materials are incorporated by reference herein.

Step 2

Step 2 initially comprises selecting two points out of the primary k+1 points generated in step 1, and then computing the k coordinates of their midpoint. It represents a single interaction between two primary effects of the process.

Mathematically, the midpoint is computed by averaging the corresponding coordinates of the selected points. Step 2 now recites projecting the midpoint onto the circumscribed spherical shell, so that it is the same distance from the origin as the primary k+1 points.

Mathematically, the coordinates of the new midpoint are scaled so that it too is a unit distance from the origin.

Step 3

Step 3 comprises selecting another (untreated) pair of points and repeating step 2. Continue until all distinct pairs of primary points have been treated. There are a total of 0.5k(k−1) such pairs.

This completes the initial design. There are now a total of k+1+0.5k(k−1)=0.5(k+1)(k+2) points, which is the desired number.

Note that this design is rotatable (due to its symmetry), and can be used in its current "coded" form, or scaled to represent real values for process variables.

EXAMPLE

Process is in semiconductor manufacturing in the photo-sector and contains 6 control parameters used in a specific level exposure step.

The process contains 6 input variables: X, Y, and Skew which are alignment subsystem parameters, and Rotation (ROT), Magnification (MAG) and Anisotropic magnification (Amag) which are adjustable optical pattern exposure tool parameters.

The output is Overlay (O/L) which is optimized at 0 (i.e., no O/L error).

The nominal values for all parameters are 0 (i.e, no adjustment is needed when the exposure tool operates as it was designed). As the tool ages, these values are no longer correct, and an experimental design is required to find the optimal operating values of these parameters.

A FIG. 2 program 12 (written in APL) can implement said design on a conventional computer. The resulting experimental design is shown in a Table, FIG. 3, numeral 14.

What is claimed is:

1. A method for controlling manufacturing processes via efficient experimental design, comprising:

(1) representing in k dimensional space, k specific values for k variables representative of manufacturing parameter values;

(2) developing a (k−1) dimensional space corresponding to the surface of the k dimensional space, said surface of said k dimensional space comprising a spherical surface; and (3) selecting a set of n points on the surface of the k dimensional space such that a coverage density of the n points on the (k−1) dimensional surface is uniform, whereby the (k−1) dimensional surface is covered so that no manufacturing parameter value is weighted more than any other manufacturing parameter value.

2. A method according to claim 1, wherein said selecting said set comprises selecting a set of n points for accounting for all main effects of the manufacturing parameters and all pairwise interactions between said manufacturing parameters.

3. A method according to claim 1, comprising implementing said representing, said developing and said selecting in a computer.

4. The method according to claim 1, further comprising developing said n points on said k-dimensional space comprising said spherical surface, said n points comprising experiments.

5. The method according to claim 1, wherein said n points are uniformly distributed on said spherical k-dimensional surface.

6. The method according to claim 1, further comprising generating a k-dimensional simplex circumscribed by a spherical k-dimensional space, and wherein primary points comprise vertices of the simplex.

7. A method for controlling manufacturing processes via efficient experimental design, comprising:

(1) generating in k-dimensional space, a k dimensional simplex circumscribed by a (k−1) dimensional spherical shell;

(2) selecting (k+1) vertices of the simplex comprising k vertices corresponding to k manufacturing variables plus a constant for a manufacturing model;

(3) selecting all 0.5k(k+1) pairs of the vertices of said k dimensional simplex;

(4) locating the midpoint of each said pairs of the vertices of said k dimensional simplex; and (5) projecting all located midpoints onto the (k−1) dimensional spherical shell, identifying all pairwise interactions between manufacturing process parameters; thereby identifying all main effects and all pairwise interactions between manufacturing process parameters, resulting in an efficient experimental design.

8. A method according to claim 7, comprising implementing said generating, said selecting (k+1) vertices, said selecting all 0.5(k+1) pairs, said locating, and said projecting in a computer.

9. The method according to claim 7, wherein midpoints of the pairs of vertices are selected for treating interactions between a pair of factors.

10. The method according to claim 7, wherein points are uniformly distributed on a surface of said (k−1) dimensional spherical shell.

11. The method according to claim 7, wherein midpoints of the pairs of vertices are selected for treating interactions between a pair of factors.

* * * * *